United States Patent [19]

Judd

[11] 4,369,396
[45] Jan. 18, 1983

[54] COLOR CATHODE-RAY TUBE APPARATUS WITH SHADOW MASK

[75] Inventor: Ian D. Judd, Chandler's Ford, England

[73] Assignee: International Business Machines Corp., Armonk, N.Y.

[21] Appl. No.: 154,340

[22] Filed: May 29, 1980

[30] Foreign Application Priority Data

Jun. 27, 1979 [GB] United Kingdom ............... 7922378

[51] Int. Cl.³ .................... H01J 29/74; H01J 29/76
[52] U.S. Cl. .................................. 315/369; 358/68; 313/403
[58] Field of Search ............ 315/369, 12 ND; 358/67, 358/68, 69; 313/402, 403, 408

[56] References Cited

U.S. PATENT DOCUMENTS

| | | | |
|---|---|---|---|
| 2,900,562 | 8/1959 | Burns, Jr. ................. | 358/68 |
| 2,943,219 | 6/1960 | Bryan . | |
| 2,961,576 | 11/1960 | Burgett, Jr. ............... | 358/68 |
| 3,030,439 | 4/1962 | Justice ..................... | 315/369 |
| 3,099,769 | 7/1963 | Lynch . | |
| 3,328,520 | 6/1967 | Macaulay ................. | 358/67 |
| 3,431,456 | 3/1969 | Liebscher . | |
| 3,501,583 | 3/1970 | Schwartz . | |
| 3,784,735 | 1/1974 | Brown et al. ............. | 358/68 |
| 3,800,072 | 3/1974 | Lejon ...................... | 358/68 |
| 3,889,145 | 6/1975 | Suzuki et al. ............. | 313/403 |

FOREIGN PATENT DOCUMENTS

| | | |
|---|---|---|
| 1136368 | 9/1962 | Fed. Rep. of Germany ........ 358/68 |
| 1344295 | 10/1963 | France . |
| 722282 | 1/1955 | United Kingdom . |
| 824761 | 12/1959 | United Kingdom . |
| 881471 | 11/1961 | United Kingdom . |
| 1517119 | 7/1978 | United Kingdom . |

Primary Examiner—Theodore M. Blum
Attorney, Agent, or Firm—Joseph J. Connerton

[57] ABSTRACT

In shadow mask color cathode-ray tube apparatus, the shadow mask is provided with slits or rows of slots extending from side to side of the mask and a line raster is constrained so that the lines of the raster are colinear with the slits, there being just one slit to each line of the raster. Open loop control may be used to achieve colinearity, but closed loop control is preferred. Beam position signals may be drived from the shadow mask by sensing secondary emission from different phosphors on the gun side of the mask or be sensing currents generated in the mask. In the preferred embodiment, the beams are dithered as they traverse the raster and the difference in the currents generated by a beam at the mask and at the conductive layer at the tube screen is detected. The first fundamental of the difference current indicates by its amplitude and phase the amount and direction of the misregistration of a beam and a slit. Different beams are distinguished by frequency multiplexing.

5 Claims, 10 Drawing Figures

COLOR CATHODE-RAY TUBE APPARATUS WITH SHADOW MASK

CROSS REFERENCE TO RELATED APPLICATIONS

Applications Ser. No. 860,402 now U.S. Pat. No. 4,203,051 issued May 13, 1980 and Ser. No. 940,695 now U.S. Pat. No. 4,203,054 issued May 13, 1980 relate to digital control for a cathode ray tube.

Application Ser. No. 154,552 relates to positional information derivation in a color cathode ray tube apparatus.

BACKGROUND OF THE INVENTION

This invention relates to color cathode-ray tube apparatus with a shadow mask.

In a color-cathode ray tube, the requisite color is achieved by selectively activating phosphors which emit, respectively, three different primary colors, red, green and blue. Three electron beams are generated which are intended to activate respectively, the red, green and blue phosphors. The primary color components of the required color are obtained by appropriately modulating the respective beams. The problem of ensuring that a beam lands only on the appropriate phosphor, that is, of ensuring color purity, is solved by the shadow mask. This is a parallax device located close to the screen of the cathode-ray tube and comprises an apertured metal sheet, the apertures being arranged such that a beam can land only on the appropriate phosphor. Usually, the shadow mask is used to control the deposition of the phosphors on the screen.

There are two patterns of shadow mask in general use. In the first, the dot shadow mask has about 350,000 circular holes arranged in a hexagonal array. The individual electron beams are large enough to cover about three holes, so that at any given time the red gun, for example, has the potential to activate several phosphor dots. To the viewer of the cathode-ray tube screen, what appears as a single red patch is actually the emissions from several phosphor dots. The other type of shadow mask is slotted and consists of vertical rows of slots, each vertical row being offset relative to the adjacent rows. With each slot of the shadow mask are associated three slot shaped different color phosphors. In a variation of this type of shadow mask, known as the aperture grill, the slots extend from the top to the bottom of the display area of the screen to form continuous slits. Heretofore, slotted shadow masks have been used in conjunction with a horizontal line raster in which the electron beams are caused to trace a sequence of parallel lines extending from side to side of the screen. The lines of the raster are perpendicular to the slots or slits in the shadow mask.

The contemporary shadow mask color television tube gives a satisfactory picture when used in domestic surroundings with the screen being viewed from a distance of 2 or 3 meters. Using a shadow mask color television tube as a display terminal for the display of text or of complex graphics where the user is at a distance of 1 meter or less from the screen imposes higher standards of resolution on the color tube, not only because at this distance the eye can more readily resolve the picture into its components, but also because of the large amount of information it is desirable to present. The typical aim of a designer would be to construct a terminal capable of displaying a picture consisting of 512 rows, each containing 720 picture elements (pels). A picture element is the smallest independently controllable region of the screen at which any color can be displayed. To reduce brightness variations due to random displacements of the electron spots relative to the shadow mask apertures, it is generally accepted that there should be at least 1.4 times as many apertures per row as there are pels. This implies the provision of about 1000 apertures per row. Standard television shadow masks now available have about 500 apertures per row. Substantial improvements in manufacturing techniques will be required to achieve the required standard at reasonable cost.

Another problem is encountered when the number of apertures is increased. It is usual to provide a purity margin between the different phosphor regions to allow for relative displacements of the beam sources, the mask and the screen, which occur for example when the electron guns are installed or the mask heats during use. The purity margin permits some misregistration of these items without activating an incorrect phosphor or partially activating a desired phosphor, resulting in loss of color purity. This can be achieved by making the cross-section of an electron beam emerging from a shadow mask aperture either substantially smaller or substantially larger than the area of the corresponding phosphor dot or stroke. The former case is termed positive tolerance and the latter case negative tolerance. Current design practice uses negative tolerance. In this case the purity margin may be separated into a 'leaving' tolerance and a 'clipping' tolerance. The former is defined as the smallest distance in any direction which the mask can move relative to the screen before part of a phosphor dot is no longer illuminated; the latter is measured in the same way at the point where electrons start to illuminate an adjacent (incorrect) phosphor dot. In the following discussion, the leaving tolerance will be assumed equal to the clipping tolerance, and the term "purity margin" will be used to describe either tolerance. As the number of apertures and thus the number of phosphor elements increases, the relative area of the screen occupied by the purity margin increases and the number of electrons getting through the apertures and doing useful work in producing light by impacting phosphor decreases.

SUMMARY OF THE INVENTION

The invention solves these problems by providing a multigun cathode-ray tube apparatus with a shadow mask and means for causing the beams to trace a line raster, characterized in that the shadow mask is provided with slits extending from one edge to the other of the display area, each line of the raster being colinear with a different slit, there being for each slit a corresponding raster line.

Preferably, means responsive to the position of the beams relative to the slits control the beams so as to trace paths colinear with the slits.

It should be understood that the term "slits" is intended to include either continuous or discontinuous linear apertures. A slit within the intended meaning may comprise a row of slots, provided that the distance between the adjacent ends of the slots is small compared with the spot diameter at the shadow mask such that the spot is not visibly occluded. The dimensions may be those of domestic TV set in which the distance between adjacent slots is approximately equal to the width of a slot. The essential features of the invention are that there is for each aperture or row of apertures a corresponding line of the raster, and that the raster lines are colinear with, i.e. coincide with, the apertures or rows of apertures.

The means for achieving colinearity of the raster lines and the slits may be implemented in a variety of ways. The deflection system may be a refinement of present domestic color television techniques in which the coils and drive circuits are so designed as to give the required accuracy of deflection with little or no adjustments. It is believed, however, that the best results will be achieved by using a feedback system, which as mentioned above, is responsive to the position of the beams to control the deflection of the beams. The feedback system can be open loop or closed loop. If it is an open loop system, the system can periodically be adjusted automatically or the user can adjust the system, preferably by the methods described in British Patent 1,517,119 and copending U.S. patent application Ser. No. 940,065 now U.S. Pat. No. 4,203,054 issued May 13, 1980. These documents describe the digital storage of correction currents used to adjust the deflection of the electron beams of a cathode-ray tube. The particular application described is convergence correction in which the user operates a keyboard to change the stored digital values until the picture is satisfactory. The new values are then used in subsequent operation of the cathode-ray tube.

In the preferred embodiment, however, a continuous closed loop feedback deflection system is used. The means for deriving beam position information may comprise some of the systems familiar in beam index tubes which will be mentioned hereinafter but, preferably, consists of the system which is also described and claimed in our copending application Ser. No. 154,552, wherein the currents generated by an electron beam at the shadow mask and at the screen are compared to determine the proportion of the beams passsing through the slit. In order to discriminate the direction of error, the beam is given a predetermined dither (spot wobble). Although it is preferred to use this system as a closed loop control, it can be used in an open loop mode.

A subsidiary advantage of the present invention is that it shares with the slitted shadow mask and with an orthogonal raster the quality of substantially improving the transparency of the shadow mask. In a high resolution tube using a shadow mask with round holes, about 14% of the electrons generated by the gun produce useful light output. An aperture grill with raster lines orthogonal to the slits has a transparency of about 20%. The transparency is slightly less if the slits are replaced by slots. The transparency of the shadow mask and coincident raster arrangement of the invention is also about 20% for uniform illumination. However, the arrangement of the invention gives a substantially greater screen brightness, essentially because the densest electron concentration of the beam is always aligned with the slit. Across an electron beam section the density of electrons follows an approximately Gaussian distribution. In known shadow masks, the beam staddles several apertures and the electrons passing through the apertures have a high probability of not coming from the densest part of the beam, especially at the edges of the mask. In accordance with the invention, the beam is caused to follow the aperture and so the peak of the Gaussian distribution is coincident with the slits. Even when the preferred dither closed loop control system is used, that part of the beam getting through the shadow mask is still high on the Gaussian curve. This gives the opportunity of achieving good brightness with a smaller spot. For example, with a slit pitch of 0.39 mm and a purity margin of 0.019 mm, a beam of diameter 0.76 mm, measured at the 5% intensity level, gives an effective mask transparency of 24%. (The same mask with orthogonal raster gives an effective mask transparency of 20%). Reducing the beam size to 0.51 mm, with the other parameters unchanged increases the effective mask transparency to 35%.

The invention has the subsidiary advantage that Moire interference between the shadow mask structure and the image content is completely eliminated. This permits the electron spots to be focused as sharply as the electron optics will allow in order to maximize resolution in the direction parallel to the scan lines. Since the shadow mask ensures that individual pels are separetely resolved in the direction orthogonal to the slits (there is one slit to each row of pels), spot astigmatism might be deliverately employed further to enhance resolution in the direction parallel to the slits. For example, an eliptical spot with its major axis orthogonal to the slit can be of such size that effectively a square beam passes through the slit.

When the invention is implemented using a closed loop feedback system, color convergence of the three beams in the direction orthogonal to the slits is automatically ensured. Pin-cushion and non-linear distortion of the raster in this direction is also eliminated. Conventional means may be employed to remove nonconvergence and other non-linearities in the direction parallel to the slits.

Is is interesting to compare the system of the invention with the beam index tube wherein a signal indicative of beam position is derived from a periodic structure at or near the tube screen. Color purity can only be achieved in the beam index tube by keeping the electron spot size small enough to strike only one phosphor. As the required resolution increases, so must the width of a phosphor stripe, and thus the size of the electron spot decreases. Since, for a given electron gun, achievable beam current typically is proportional to spot diameter raised to the 8/3 power, small differences in spot diameter effect large differences in achievable screen brightness. For example, with a slit pitch of 0.39 mm and a purity margin of 0.019 mm, a beam of 0.76 mm spot diameter at the shadow mask can be used without significant overspill through the adjacent slits. A comparable resolution beam index tube requires a spot diameter of 0.1 mm to give acceptable color purity.

The invention will further be explained by way of example with reference to the accompanying drawings, in which:

DETAILED DESCRIPTION

Figure 1:
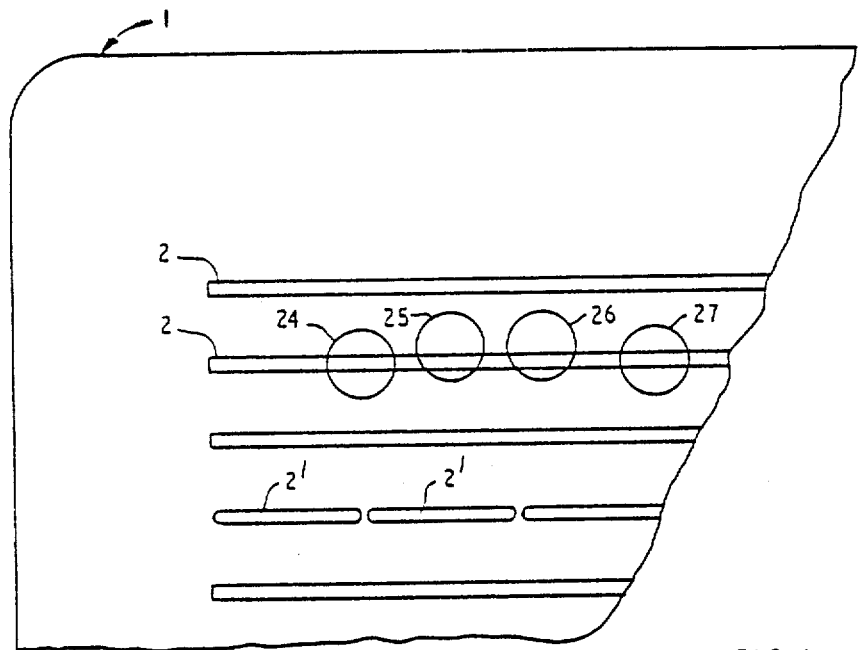
FIG. 1 is a schematic representation of part of a shadow mask used in apparatus according to the invention.

Referring to FIG. 1, the shadow mask 1 used in apparatus according to the invention is of substantial conventional construction, differing from known shadow masks only in the number of apertures and the relative orientation of the apertures and the raster scan. The apertures are in the form of straight slits 2 or rows of slots 2', extending at least from one edge to the opposite edge of the region in which a display is generated. For convenience, the apertures will be referred to as slits, which term comprehends both the slits 2 and the rows of slots 2'. The shadow mask 1 is used in a color multi-gun cathode-ray tube of which the beams, which may be interlaced, are caused to trace a line raster. In accordance with the invention, there is one line of the raster to each slit 2 and the lines of the raster are caused to coincide with the slits 2, i.e., the raster lines are colinear with the slits 2. Although in practice it is found most convenient to provide a horizontal line raster, in which case the shadow mask 1 is as shown in FIG. 1, the invention can also be applied to a vertical line raster, in which case the slits 2 are disposed vertically. As is well-known, the shadow mask is a parallax device which ensures, after initial purity adjustment, that the electron beams from different guns impact respectively only different phosphors. It follows that with a horizontal line raster, the electron guns of a cathode-ray tube according to the invention should be arranged so as to subtend different vertical angles to the slits 2. While it is preferred to have the guns arranged in-line perpendicular to the slits 2, the invention is also applicable to a delta gun arrangement with one side of the triangle of which the guns are the apices perpendicular to the slits.

By way of example, there may be 512 horizontal slits each 0.13 mm wide and with centers spaced at a distance of 0.39 mm. In conjunction with phosphor stripes 0.092 mm wide, this provides clipping and leaving tolerances of 0.019 mm for the maintenance of color purity. As is usual practice, the inner walls of the slits are tapered to a point to prevent beam electrons, scattered by impact with the side walls, activating screen phosphors to generate unwanted colors. This may be done by etching the slits from only one side of the mask so that the beam exit aperture is wider than the beam entrance aperture.

We now consider the means whereby the electron beams are caused to follow the slits. Although it is possible to construct deflection coils and driving circuits of such accuracy that the beams are colinear with the slits over most of their length, the tolerance of the user of a display terminal to picture and color defects is much lower than that of the user of a domestic color TV tube, and in any case the cost is such as render the use of such deflection means commercially impractical. An alternative is to use somewhat cheaper deflection circuitry but to provide a means whereby the user can easily adjust the picture to his satisfaction. Such a system is described in the aforereferenced U.S. application Ser. No. 860,402. For each electron beam, numerical correction factors are held in a digital store. As the beams traverse the screen, the appropriate correction factors are read from the store and converted, by digital to analog converters, into currents which are supplied to the beam deflection coils. As required, the user can cause the display of test patterns and, by operating a keyboard, can adjust the stored correction factors until the displayed patterns are satisfactory. This system has the advantage that adjustment is only to the user's satisfaction and not to some hypothetical standard which may be inappropriately high to the workplace and the type of data being displayed. It is envisaged, however, that the requirement of colinearity imposed by the present invention will necessitate frequent adjustments, causing undue interference with the normal work of the user. It is preferred, therefore, to provide some form of automatic adjustment of the colinearity of the electron beams and the slits.

Figure 2:
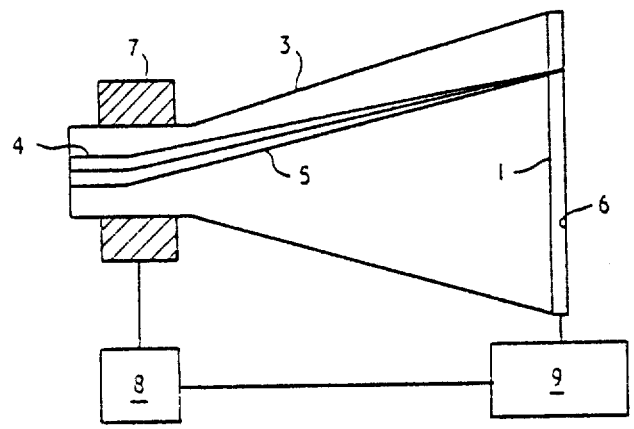
FIG. 2 is a block diagram illustrating the principle of feedback control.

Schematically, the arrangement is shown in FIG. 2. A multi-gun color cathode-ray tube 3 has a shadow mask 1 according to the invention, electron guns 4 directing beams 5 at the screen 6 and deflection means 7 supplied from deflection control 8 with signals which cause the beams to trace a linear raster of which each line coincides with a respective slit in the shadow mask. An error detector 9 derives from the electron beams a positional error signal which indicates the lack of coincidence of the beams with the slits in the shadow mask. The error signal from error detector 9 is used to modify the signals generated by deflection control 8 such that the error signal is minimized. Thus automatic control can be continuous of intermittent. If intermittent, it can be done at the user's request, for example, in response to actuation of an "adjust" key of a keyboard, or it can be performed at predetermined intervals. It is preferred, however, that the control system operate continuously.

Figure 3:
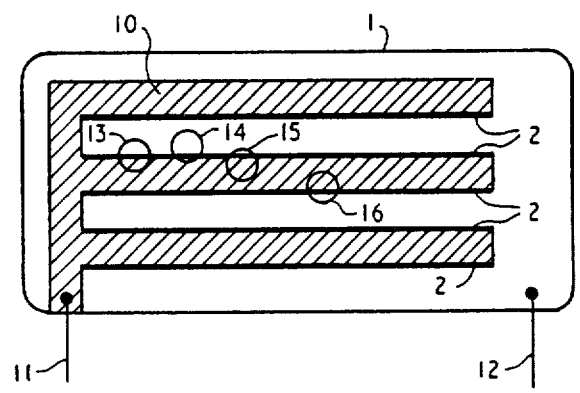
FIG. 3 shows one means of obtaining beam position information from a shadow mask according to the invention.

Before describing the preferred method of deriving the error signal, other methods within the scope of the invention will be discussed briefly. It should be mentioned that the technology of beam-index color tubes provides examples of arrangements suitable to obtain error signals from the screen. The adaptation of these methods to the shadow mask multi-gun cathode-ray tube will be described in connection with the preferred embodiment. In FIG. 3, the shadow mask 1 is shown with slits 2 in accordance with the invention. A comb-shaped region 10 of conductive material which is insulated from the shadow mask 1 is formed on the surface of the shadow mask facing the electron guns. The arrangement of the material 10 is such that every slit 2 is a boundary of the material 10 and the conductive material of which the shadow mask is made. Terminals 11 and 12 extend from the material 10 and the shadow mask 1, respectively. When an electron beam lands on a conductive material, a current is generated in the material. The position of the electron beam relative to the slit is indicated by the relative currents generated by the beam in the shadow mask 1 and the conductive material 10. If the beam is symmetric to a slit 2, as shown at 13, equal currents appear at terminals 11 and 12. If the beam is asymmetrically disposed, as shown at 14, 15, a larger current appears at terminal 12 than at terminal 11. The deflection control 8 (FIG. 2) operated so as to reduce the difference between the currents at terminals 11 and 12 to zero. It should be noted that the error signal is not unambiguous since beams 15 and 16 produce similar signals and yet require opposite correction signals. The problem can be resolved by inverting the error signal at each alternate line of the raster, for example, at each odd numbered raster line.

Figure 4:
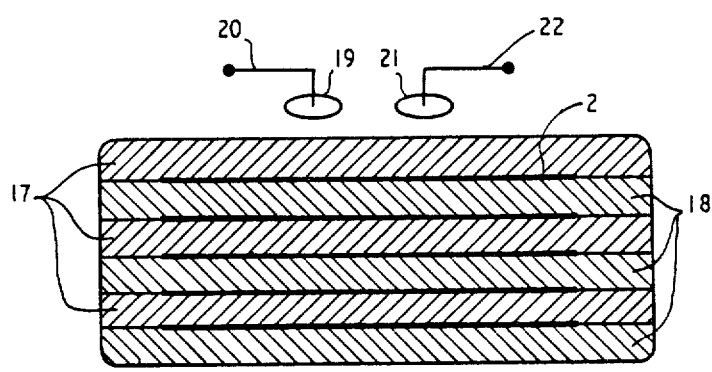
FIG. 4 shows another means of obtaining beam position information from a shadow mask according to the invention.

FIG. 4 shows another method of deriving an error signal whereby the position of an electron beam can be controlled. The error signal is of the same kind as that obtained in the embodiment of FIG. 3, but is obtained by comparison of emissions from different materials in accordance with the fraction of the beam striking the materials. The shadow mask 1 is coated on the surface facing the electron guns, with stripes of different radiation emitting materials, which we call, for simplicity, phosphor A and phosphor B. The stripes 17 of phosphor A and the stripes 18 of phosphor B are so arranged that each slit 2 is the boundary of different phosphors. Radiation from phosphor A is picked up by the detector 19 and converted to a signal on terminal 20; radiation from phosphor B is picked up by detector 21 and converted to a signal on terminal 22. If the signals on terminals 20 and 22 are unequal, the electron beam is not symmetric relative to a slit 2. Use is made of the signals on terminals 20 and 22 in the same way as the signals on terminals 11 and 12 of FIG. 3. Although only two detectors are shown in FIG. 4, which is highly schematic, in practice pairs of detectors are arranged symmetrically about the shadow mask in such a way as to equalize the the radiation falling on the detectors when the beam is symmetrical of a slit. Phosphors A and B may be any of the UV radiation emitting phosphors commonly employed in beam index tubes, the only requirement being that the two phosphors have clearly distinct emission spectra. The embodiments of of FIGS. 3 and 4 have been described only in respect of one electron beam. The problem of resolving positional information from three electron beams is solved by the frequency division multiplexing system described with reference to FIG. 5.

Figure 5:
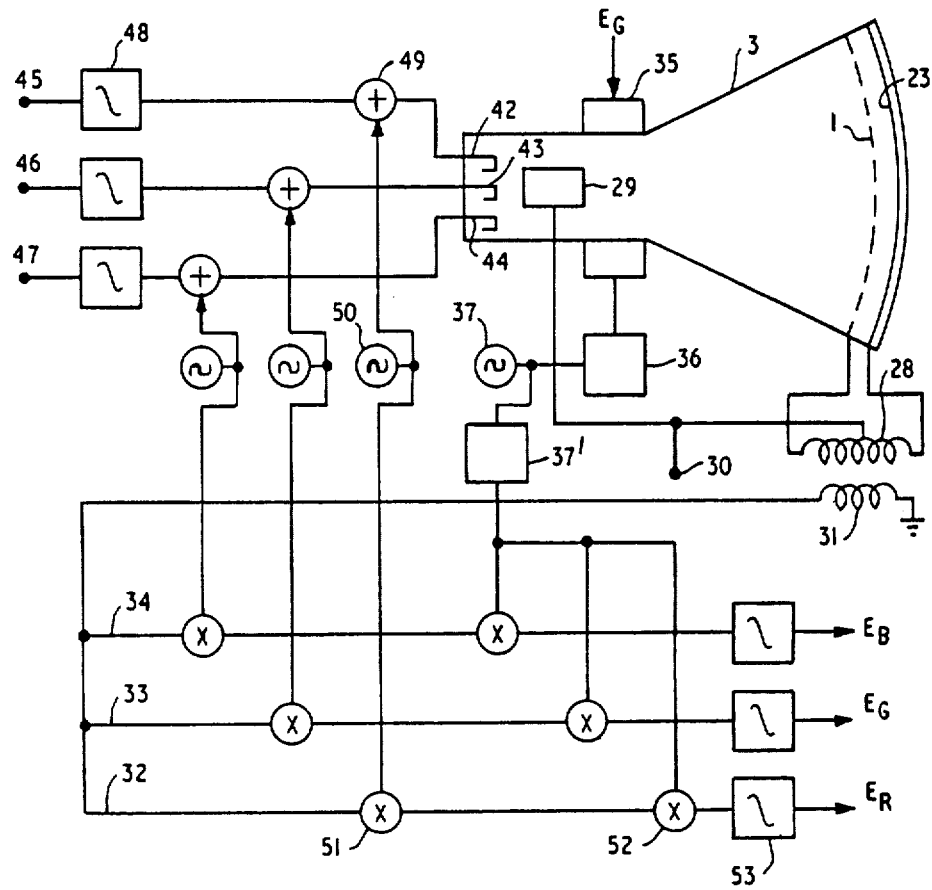
FIG. 5 is a block diagram showing the preferred closed loop feedback system according to the invention.

FIG. 5 shows the preferred embodiment of the invention, which does not rely on any modification of the shadow mask or screen of the cathode-ray tube to obtain electron beam position information. The cathode-ray tube 3 is provided with a conductive shadow mask 1 according to the invention and has also the usual conductive layer 23 on the electron gun side of the phosphor. The beam position information is obtained from the difference in currents generated by the beam in the shadow mask 3 and in the coating 23. The difference is representative of the fraction of the beam hitting the shadow mask relative to the fraction of the beam passing through the apertures in the shadow mask and hitting the conductive coating 23. Referring back to FIG. 1, it will be seen that the difference current is at a minimum when the beam is symmetric to the slit 2 and increases with the asymmetry of the beam relative to the slit. To detect the difference currents, the mask 1 and coating 23 are connected to the opposite ends of the primary coil 28 of a transformer. The coil is center tapped and connected to the final anodes 29 of the electron guns and to a source 30 of high potential, e.g. 20 kV. The means for detecting difference currents does not interfere with the usual arrangement for generating the electron beams and directing them at the screen. The secondary coil 31 of the transformer is connected at one end to ground and at the other to three channels 32, 33, 34 in which error signals for the control of the red, green and blue electron beams respectively are derived from the difference current signal appearing in secondary coil 31. As has been mentioned previously, the control problem is complicated by the fact that three electron beams are simultaneously directed at the screen. Further, each beam is modulated by a video signal. The beams can be distinguished by time division multiplexing, but it is preferred to use the arrangement shown in FIG. 5, frequency division multiplexing. The ambiguity in the sign of the tracking error is removed by imposing on each beam a spot-wobble or dither. This produces an error signal which is clearly recognizable and readily usable.

Referring to FIG. 5, the cathode-ray tube 3 has vertical deflection coils 35 which are supplied with a vertical deflection current by driver circuitry 36. An oscillator 37 supplies to the driver circuitry 36 a sinusoidal frequency $F_D$ which is superimposed on the conventional vertical deflection waveform. The effect is to oscillate each beam as shown in part in FIG. 1 where the references 24 to 27 illustrate landing positions during one halfwave of the oscillation, assuming the beam to be correctly tracking the slit 2. The amplitude of the oscillation is chosen such that the oscillation causes about a ±5% variation in the currents generated in the shadow mask and at the screen. The variation in image brightness due to the oscillation will be less than this in a tube having negative purity margin (phosphor stripe width smaller than electron spot). This is because in such a tube the width of a phosphor stripe is less than the slit width by twice the leaving tolerance. Consequently the phosphor will only be struck by electrons from near the center of the Gausian intensity curve where the slope of the curve is gradual. In cathode-ray tube apparatus designed to be operated as a data terminal, the video information is supplied in discrete form at a rate known as the pel frequency. In order to prevent beating between the dither and the video modulation, $F_D$ is synchronized with, or preferably is derived from, the same source as the pel frequency generator. Thus, the element shown as block 37 in FIG. 5 can be the clock from which the basic timing of the apparatus is derived and the frequency $F_D$ merely one output of the clock.

The dither signal $F_D$ moves the electron beams relative to shadow mask apertures and thus modulates the currents at $F_D$, $2F_D$ and higher harmonics. On the assumption that the electron beams have an intensity distribution which is approximately Gaussian, only the fundamental and second harmonic are significant. FIGS. 6 to 9 are plots of amplitude against time of the fundamental and second harmonic of the difference current detected at coil 31. The graphs also illustrate the displacement of an electron beam relative to a slit.

Figure 6:
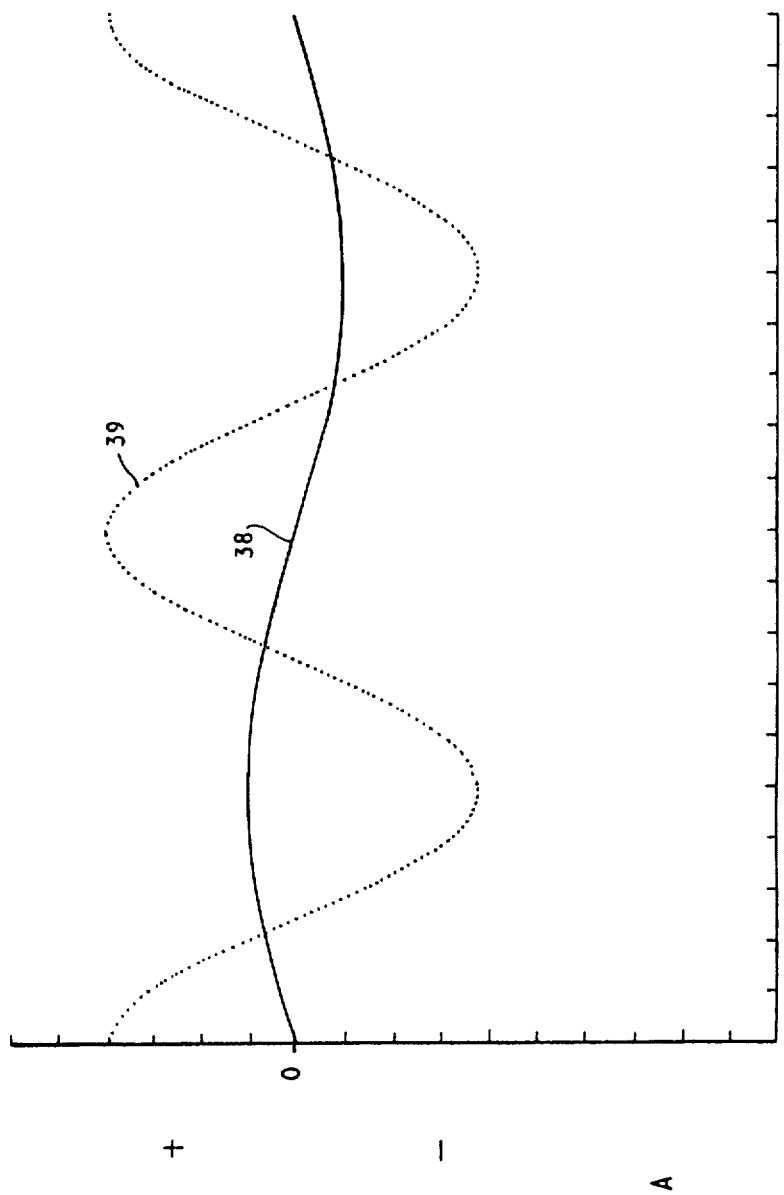
FIGS. 6 to 9 show waveforms generated in the system of FIG. 5 for different positions of an electron beam relative to a slit in the shadow mask; and, FIG. 10 shows deflection adjustment coils suitable to use the error signals derived in the system of FIG. 5.

Curve 38 of FIG. 6 represents the position of a beam which is coincident with the slit apart from the movement imposed by the dither signal. In this case the AC component of the difference current waveform 39 contains no fundamental and is almost entirely composed of the second harmonic of the dither frequency. The case in which the beam is slightly misaligned with the slit in the positive direction is shown in FIG. 7.

Figure 7:
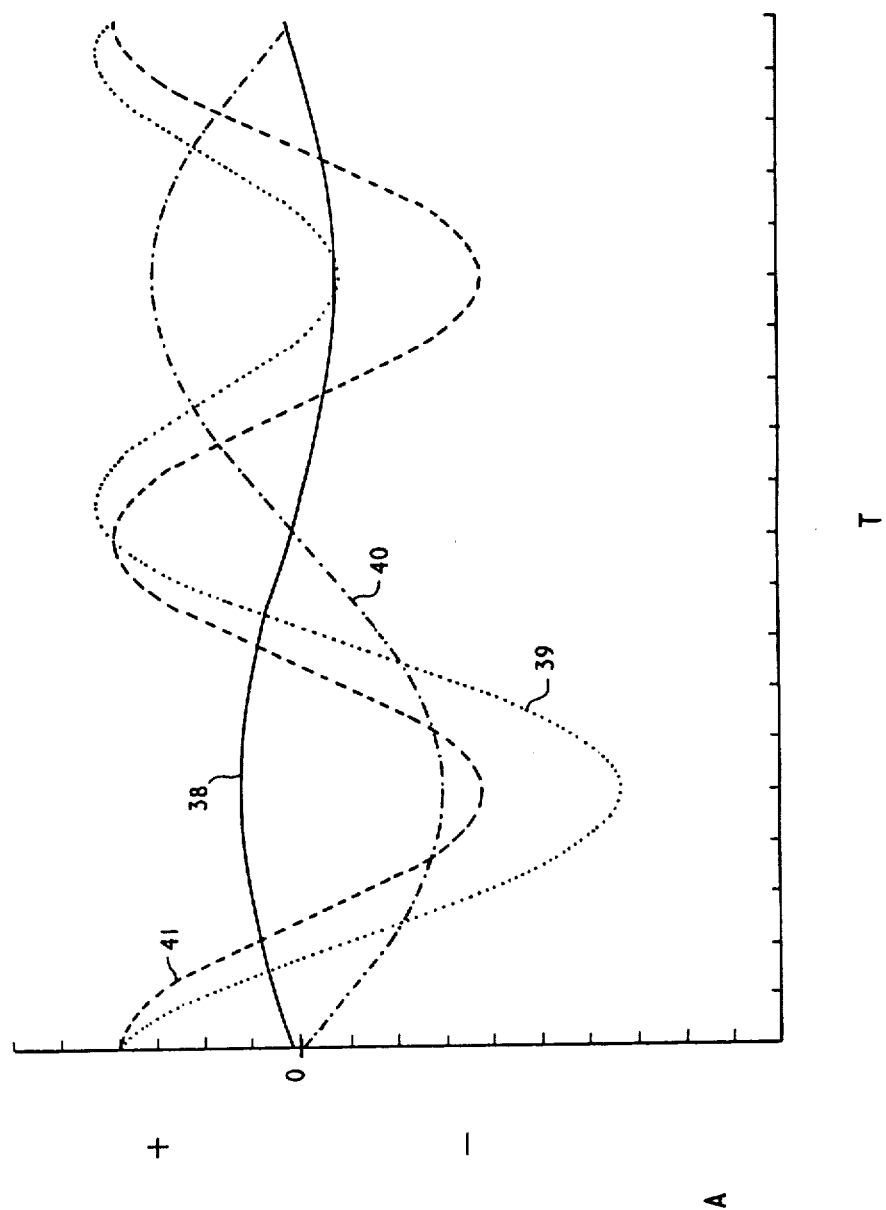
Figure 8:
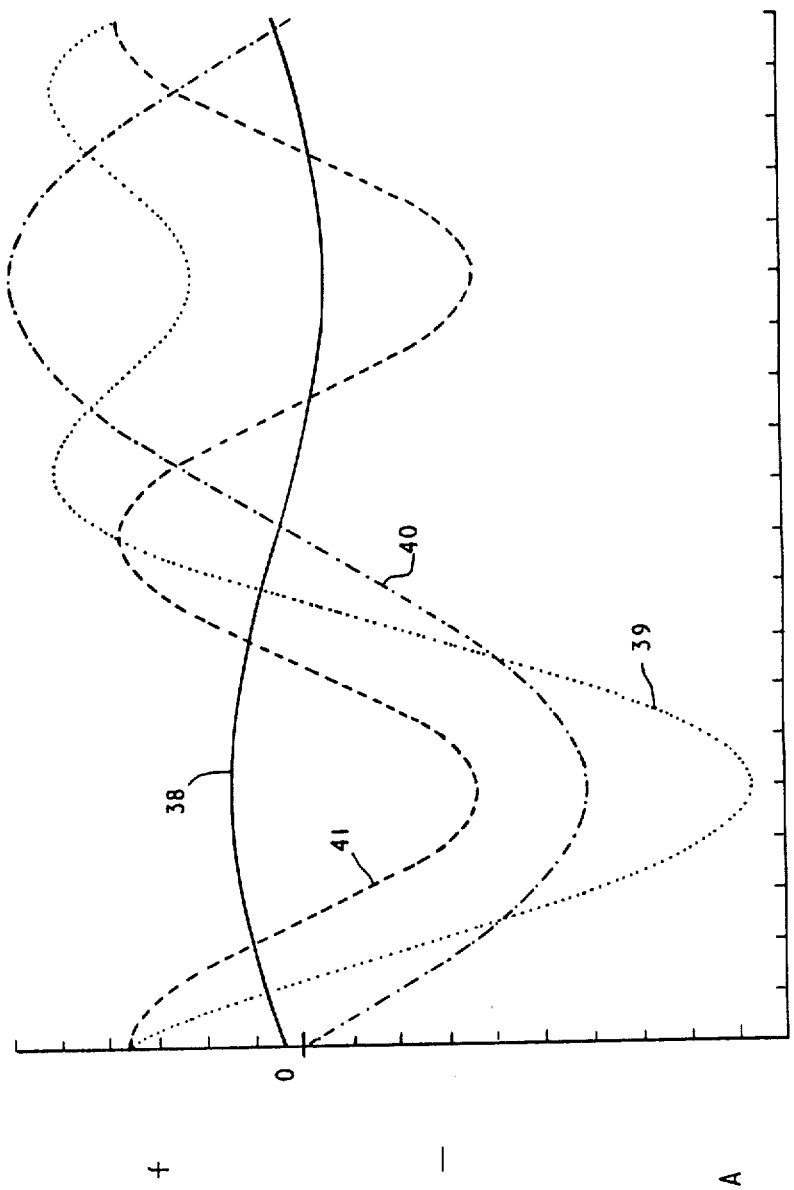
Figure 9:
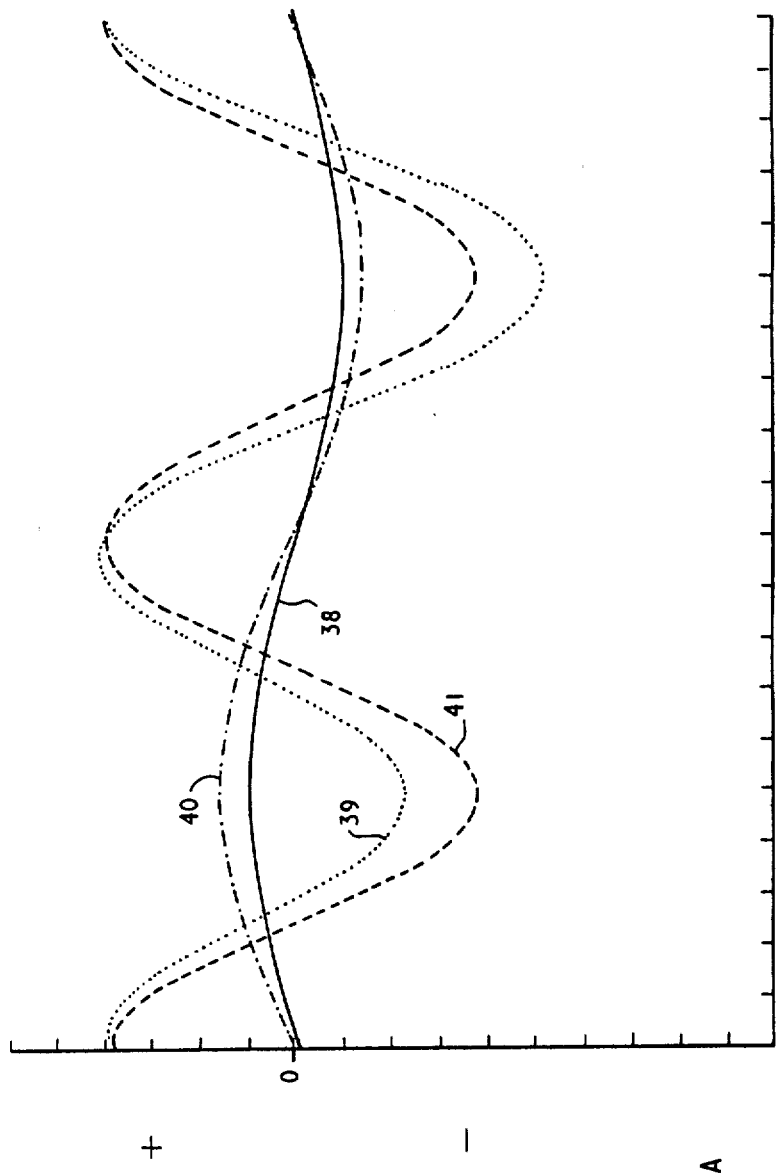

Referring now to FIG. 7, curve 38 starts at some positive value on the vertical axis. The AC component of the difference current waveform 39 is now asymmetrical, but it is significant that there is now a detectable fundamental 40 of given phase and amplitude. The second harmonic 41 is also shown. FIGS. 8 and 9 show situations in which the beam is differently misaligned with the slit. In FIG. 8, the misalignment is twice as far in the same direction as in FIG. 7, while in FIG. 9 the misalignment is half as far as and in the opposite direction to that in FIG. 7. Comparing the fundamental curves in FIGS. 7 to 9, it is seen that the fundamental indicates in phase the direction, and in amplitude, the amplitude of the misalignment of the beam with the slit. Extraction of the fundamental thus provides a signal which can be used directly to correct the alignment of the beam with the slit.

Referring back to FIG. 5, the beams are differentiated by frequency modulation. The red, green and blue guns, 42, 43, 44 receive video information at terminals 45, 46, 47 respectively. For simplicity, only the processing of the red video signal will be described. The red video signal at terminal 45 is filtered by low pass filter 48 in which the lowest cut-off frequency which will not degrade the video signal appreciably is selected. If the video pel frequency is 20 MHz, the cut-off may be chosen as 40 MH. If desired, the filter 48 may be integrated into the video amplifier design. The filtered red video is then added in summing network 49 to a carrier signal a $(1+\sin 2\pi F_R t)$ from an oscillator 50. $F_R$, and the corresponding signals in the other video channels, $F_G$ and $F_B$, are chosen above the cut-off frequency of the low pass filter 48 (the filters in each channel are identical) and sufficiently different so as to avoid side band overlap after amplitude modulation by the dither signal. The three frequencies should also be non-harmonically related to avoid mutual interference due to non-linear distortion. For example, $F_R=60$ MHz, $F_G=70$ MHz and $F_B=80$ MHz. A suitable dither frequency $F_D$ is 2 MHz. It will be noted that the presence of the carrier signal in the red video modulating signal means that the beam is never completely extinguished. The factor a should be chosen sufficiently large to give a useable signal but not so large as to reduce contrast significantly. A suitable value for a is 5% of the maximum video signal. Gamma correction of the output of summing network 49 may be required to linearize the I-V characteristic of the cathode-ray tube.

The difference currents detected in coil 31 are supplied to the red, green and blue error signal channels 32, 33, 34 respectively. The red channel 32 includes a demodulator 51 which mixes the signal from coil 31 with the carrier frequency $2\pi F_R t$. Ideally, this demodulator performs the analog multiplication of its inputs. A second demodulator 52 mixes the output of demodulator 51 which the dither frequency, $\sin 2\pi F_D t$. An adjustable delay 37' is provided for synchronization. Finally, a low pass filter 53 with a cutoff somewhat less than $F_D$ produces at its output the error signal $E_R$ due to the red beam. In similar fashion, error signals $E_G$ and $E_B$ due to the green and blue beams, respectively, are produced at the outputs of the green and blue error signal channels 33 and 34 respectively.

Figure 10:
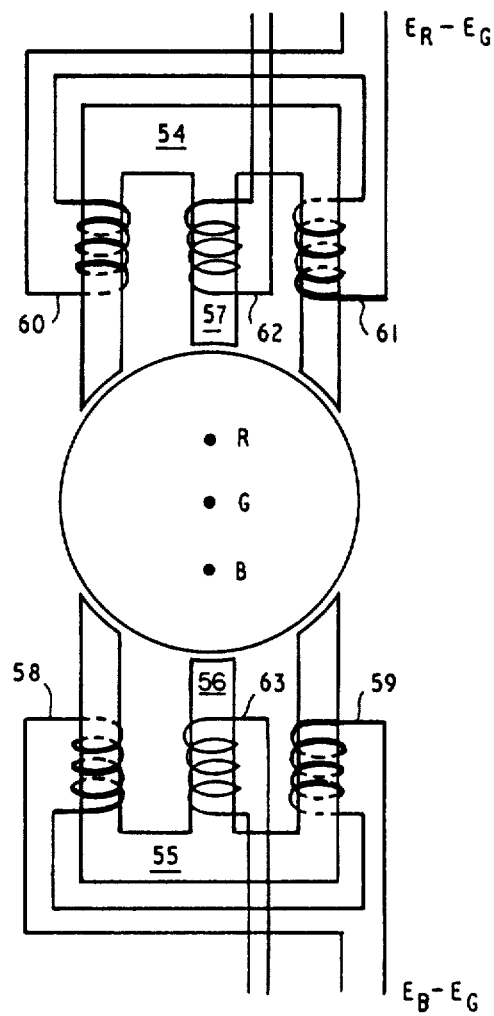

FIG. 10 illustrates one way in which the error signals $E_R$, $E_G$ and $E_B$ can be used. The figure shows a crossection of the neck of the cathode-ray tube with the electron beams R, G and B emanating from in-line guns arranged perpendicularly to the slits. Surrounding the neck of the tube is a conventional convergence correction device consisting of two three-poled armatures 54, 55 with center poles 56, 57 on the line of the electron beams. The outer poles are wound with series connected coils 58, 59, and 60, 61, respectively, which receive signals to correct the vertical component of misconvergence of the blue and red electron beams relative to the green beam. While the horizontal convergence correction is not considered a part of the present invention, the coils 62, 63 wound on the center poles correct the horizontal convergence by adjusting the horizontal position of the red and blue beams relative to the green beam. Any of the standard techniques can be used to calculate or derive the appropriate signals for the coils 62, 63. The arrangement of FIG. 10 has the advantage that the outer beams are separately controllable; armature 55 controls the blue beam and armature 54 controls the red beam. A signal $E_B-E_G$ can be applied directly to the coils 58, 59 while a signal $E_R-E_G$ can be applied directly to the coils 60, 61. The signal $E_G$ is supplied directly to the vertical deflection coils 35 (FIG. 5). The effect of $E_G$ is to adjust the vertical position of all three beams until the green beam is aligned with the slit. The signals $E_R-E_G$ and $E_B-E_G$ adjust the vertical positions of, respectively, the red and the blue beams. The signals $E_B-E_G$ and $E_R-E_G$ are derived by subtracting the signal $E_G$ from the signals $E_B$ and $E_R$, respectively, using conventional subtracting networks.

In order to prevent the different beams locking on different slits, two modification of the system described with reference to FIGS. 5 to 10 may be found desirable. To ensure that the beams start together in the top slit, initial correction currents $E_B-E_G$, $E_R-E_G$ and $E_G$ should be supplied to the coils 58 and 59, 60 and 61, and 35, respectively, at the beginning of each frame scan which position the beams at the left-hand end of the top slit. The initial currents may be derived from adjustable resistors connected to a suitable potential source. To ensure that the beams all track the correct slit after line flyback, the first correction signals applied to each line, before feedback information is available, are those applied to the preceding line. The signals $E_B$, $E_G$ and $E_R$ are sampled a short interval after the start of a line in conventional sample and hold circuits, and the sampled values are supplied to the correction coils at the conclusion of the line blanking signal, which is on during the line flyback period.

The remaining elements of cathode-ray tube apparatus according to the invention are conventional. It is preferred that the vertical deflection be effected by means of a staircase signal instead of the more usual ramp signal. The staircase signal can be generated by means of any of the commonly available integrated digital-to-analog converters to which the input is provided by a counter driven by a suitable oscillator.

Although reference has been made to deflection coils, thereby implying that the description relates only to electromagnetic deflection systems, it is to be understood that the invention is applicable also to electrostatic or mixed electromagnetic/electrostatic systems. The term "deflection coils" is intended to comprehend the deflection means used in any of the conventional deflection systems. There has been shown and described color cathode-ray tube apparatus having a shadow mask comprising straight slits or rows of slots, the deflection system being such as to cause the electron beams to trace a linear raster each line of which is colinear with a respective slit or row of slots. Although the implementation is not so restricted, the preferred embodiment of the invention comprises a frequency multiplexed closed loop control system whereby the beams are caused to coincide with the slits or rows of slots, the error signals being derived from the difference currents generated by the electron beams in the shadow mask and at the screen. The error signals are the fundamentals of the difference currents obtained when the beams are dithered by a sinusoidal signal.

Having thus described my invention, what I claim as new, and desire to secure by Letters Patent is:

1. Multi-beam color cathode-ray tube apparatus with a shadow mask for ensuring color purity and means for causing the beams to trace a line raster, characterized in that the shadow mask is formed with slits, each slit extending in the same direction as said line raster from one edge of the display area to the other so that each of the multi-beams is directed through the slits to an associated phosphor stripe, each line of the raster being colinear with a different slit, there being for each slit a corresponding raster line.

2. Apparatus as claimed in claim 1, characterized by means, responsive to the positions of the beams relative to the slits, to control the beams so as to trace paths colinear with the slits.

3. Apparatus as claimed in claim 2, comprising means to dither an electron beam by applying a sinusoidal signal to the vertical deflection coils of the cathode-ray tube, means to detect the difference between the currents generated by the beams in the shadow mask and in a conductive coating on the tube screen, and means to detect the fundamental of said difference current, which fundamental is an error signal which represents by phase, the direction, and by amplitude, the amount, of the misalignment of the beam with a slit.

4. Apparatus as claimed in claim 3, wherein the error signal is derived for each electron beam, there being frequency division multiplexing means whereby the error signals from the respective beams are detected.

5. Apparatus as claimed in claims 1 or 2, characterized in that the shadow mask provides a signal indicative of the misalignment of the beams with a slit.

* * * * *